UNITED STATES PATENT OFFICE.

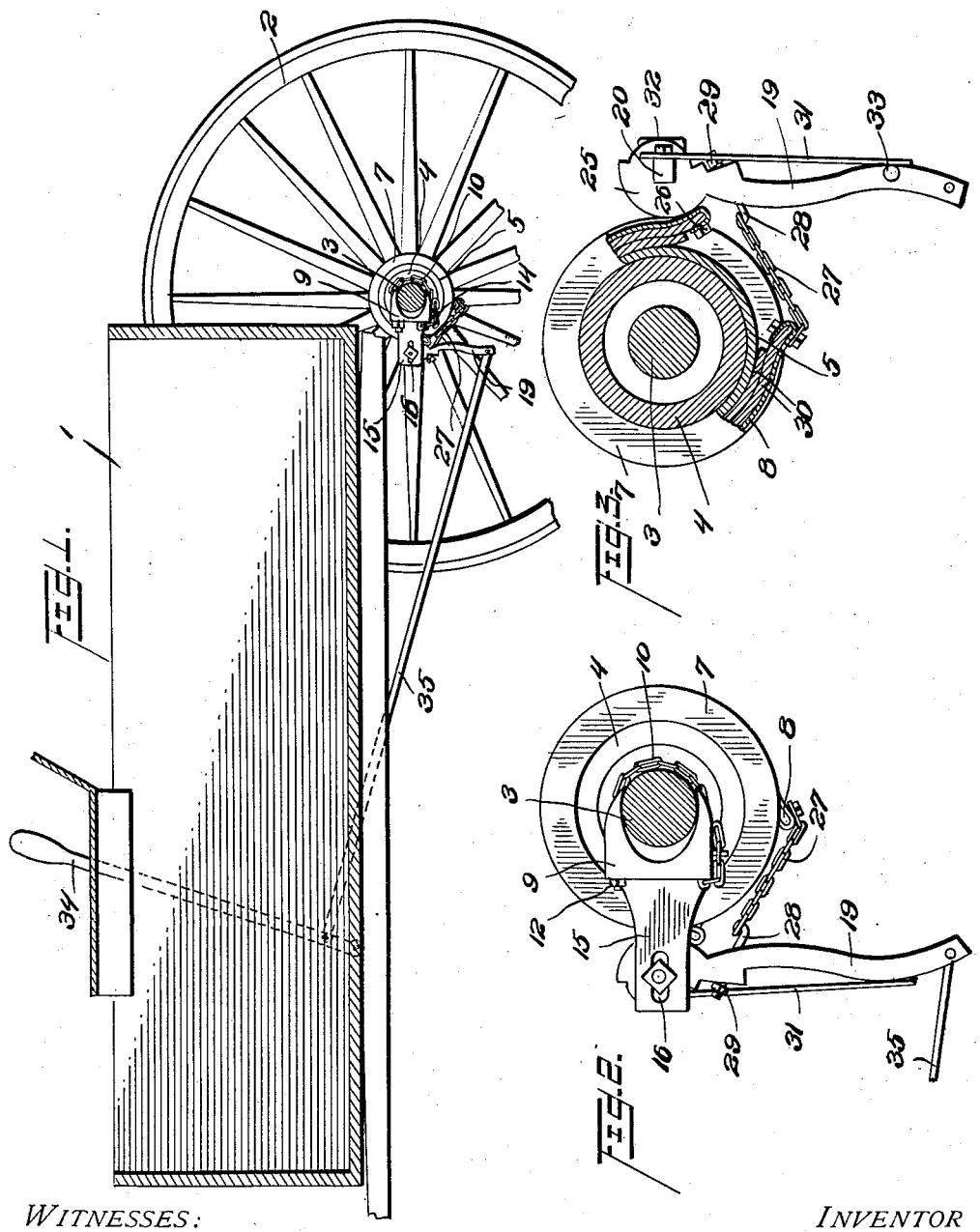

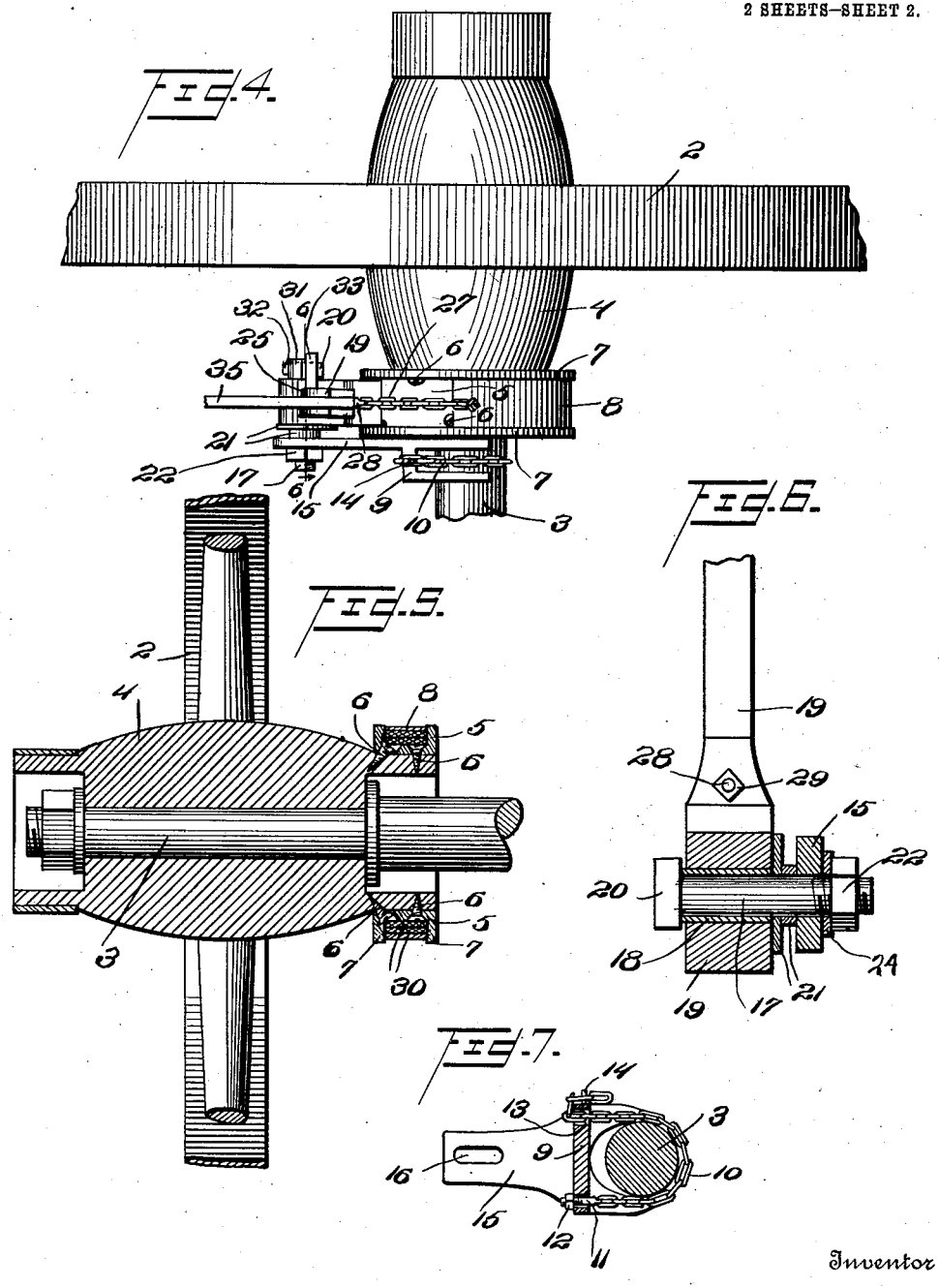

MATTHEW C. MUIR, OF PHILADELPHIA, PENNSYLVANIA.

VEHICLE-BRAKE.

1,024,694.  Specification of Letters Patent.  Patented Apr. 30, 1912.

Application filed September 18, 1911. Serial No. 649,869.

*To all whom it may concern:*

Be it known that I, MATTHEW C. MUIR, a citizen of the United States, residing at Philadelphia, in the county of Philadelphia and State of Pennsylvania, have invented certain new and useful Improvements in Vehicle-Brakes, of which the following is a specification.

My invention relates to improvements in vehicle brakes, the object of the invention being to provide an improved hub brake which is especially designed for use in connection with carriages and wagons, and which is extremely sensitive and capable of maximum frictional engagement with the hub or band thereon to quickly stop the rotary movement of the wheel.

A further object is to provide a brake of this character which may be readily connected to any ordinary vehicle, and which will be strong and durable in use.

With these and other objects in view, the invention consists in certain novel features of construction and combinations and arrangements of parts, as will be more fully hereinafter described and pointed out in the claims.

In the accompanying drawings: Figure 1, is a fragmentary sectional view illustrating my improvements in position on an ordinary wagon. Fig. 2, is an enlarged view illustrating my improvements in connection with an axle and wheel hub. Fig. 3, is a view taken from the side opposite to Fig. 2, showing the hub and other parts in section. Fig. 4, is an enlarged fragmentary bottom plan view. Fig. 5, is a view in longitudinal section of Fig. 4. Fig. 6, is a detail sectional view on the line 6—6 of Fig. 4, illustrating the brake arm and its mounting, and Fig. 7, is a sectional view illustrating the supporting bracket.

1, represents a vehicle body, and 2 the rear wheel of said vehicle mounted to turn on an axle 3, the other parts of the vehicle being omitted as unnecessary to illustrate the invention.

The wheel 2 is provided with a hub 4 around the inner end of which a collar 5 is secured by screws 6. This collar 5 is provided at its edges with annular flanges 7 to confine my improved brake strap 8, the construction and operation of which will be hereinafter explained.

A bracket 9 is secured to the axle 3 by means of a chain 10. Bracket 9 has its inner portion bifurcated and recessed to receive the axle, and chain 10 is secured by means of a bolt 11 and nut 12 to one side of the bracket, is then passed around the axle and through an opening 13 in the other side of the bracket, and one of the links of the chain is caught over a pin 14 on the bracket, whereby the bracket is firmly held against the axle.

The free end of the bracket constitutes an arm 15 having a longitudinal slot 16 therein through which a pivot bolt 17 projects. Around the pivot bolt 17 a sleeve 18 is positioned, and on this sleeve, a brake arm 19 is fulcrumed. The bolt 17 preferably has a head 20 at one end which bears against the arm, and spacing washers 21 are positioned between said arm and the bracket arm 15, while a nut 22 is screwed onto the free end of the bolt and against a washer 24 interposed between the arm 15 and said nut, whereby said nut serves to clamp the several parts together, and by loosening this nut the position of the pivot bolt may be adjusted in the slot 16. Brake arm 19 is provided at its fulcrum end with a cam enlargement 25 to which one end of the brake strap 8 is secured by means of a screw 26. The other end of the brake strap is connected by a chain 27 with a hook bolt 28, and the latter is projected through an opening in the arm 19, and is securely held by means of a nut 29. By adjusting this nut 29, the strap may be adjusted. The strap is preferably composed of an outer strip of spring metal having inner facing straps 30 of leather or other suitable material to tightly engage collar 5.

To the head 20 of pivot bolt 17, a flat spring 31 is secured by means of a screw 32, and the free end of this spring 31 engages a pin 33 on the arm 19 to hold the arm in normal position, and return it to such position.

Various forms of operating mechanism may be provided, a simple form being illustrated in which a hand lever 34 is pivoted to the body 1, and is connected by a rod 35 to the free end of arm 19. When this lever 34 is moved forwardly, arm 19 is drawn forwardly, and while the cam 25 presses one end of the strap against the collar, chain 27 draws the other end of the strap, and the collar 5 is securely clamped in the strap, and the wheel is stopped. When the pressure on the lever is released, spring 31 will move the arm 19 back to its normal position and permit the strap 8 to release collar 5 and the hub to which it is secured.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a collar adapted to be secured on a wheel hub, and a bracket adapted to be secured to an axle adjacent the wheel hub, of a pivot bolt secured in said bracket, an arm fulcrumed on said pivot bolt and having a cam face at its fulcrum end, a strap positioned around the collar and secured at one end to the cam face of said arm, a chain connecting the other end of said strap with said arm, said bracket having a bifurcated end adapted to receive the axle, a chain secured at one end to said bracket and adapted to be passed around the axle and through an opening in said bracket, and a pin on said bracket to receive a link of said chain, substantially as described.

2. The combination with a collar adapted to be secured on a wheel hub, and a bracket adapted to be secured to an axle adjacent the wheel hub, of a pivot bolt secured in said bracket, an arm fulcrumed on said pivot bolt and having a cam face at its fulcrum end, a strap positioned around the collar and secured at one end to the cam face of said arm, a chain connecting the other end of said strap with said arm, a pin on said arm, a spring secured to said pivot bolt bearing against said pin and holding the arm in normal position, said bracket having a bifurcated end adapted to receive the axle, a chain secured at one end to said bracket and adapted to be passed around the axle and through an opening in said bracket, and a pin on said bracket to receive a link of said chain, substantially as described.

3. The combination with a vehicle axle, a vehicle body, a wheel mounted to turn on said body, and a collar secured to the hub of said wheel and having flanges at its edges, of a bracket secured to the axle, said bracket having a slot therein, a pivot bolt adjustably secured in said slot, an arm fulcrumed on said bolt and having a cam at its fulcrum end, a strap secured at one end to said cam portion of the arm and positioned around the collar, a bolt adjustable in said arm, a chain connecting said bolt with the other end of said strap, a spring secured to said bolt and holding said arm in normal position, a lever on the body, and a rod connecting said lever and said arm, substantially as described.

In testimony whereof I have signed my name to this specification in the presence of two subscribing witnesses.

MATTHEW C. MUIR.

Witnesses:
S. W. FOSTER,
C. R. ZIEGLER.

---

Copies of this patent may be obtained for five cents each, by addressing the "Commissioner of Patents, Washington, D. C."